United States Patent
Taqvi et al.

(10) Patent No.: US 7,393,041 B2
(45) Date of Patent: Jul. 1, 2008

(54) SUNBLIND

(75) Inventors: Jonathan Taqvi, Ravenshead (GB); Robert Leadbeater, Bingham (GB)

(73) Assignee: O.E. Sunshades Limited (GB)

( * ) Notice: Subject to any disclaimer, the term of this patent is extended or adjusted under 35 U.S.C. 154(b) by 0 days.

(21) Appl. No.: 10/565,614

(22) PCT Filed: Jul. 23, 2004

(86) PCT No.: PCT/GB2004/003205

§ 371 (c)(1),
(2), (4) Date: Apr. 6, 2006

(87) PCT Pub. No.: WO2005/012016

PCT Pub. Date: Feb. 10, 2005

(65) Prior Publication Data

US 2006/0186690 A1    Aug. 24, 2006

(30) Foreign Application Priority Data

Jul. 24, 2003  (GB) ................... 0317270.7
Jan. 29, 2004  (GB) ................... 0401895.8

(51) Int. Cl.
*B60J 3/00* (2006.01)

(52) U.S. Cl. .................. 296/97.5; 296/97.1; 160/370.21; 160/DIG. 3

(58) Field of Classification Search ............. 296/97.1, 296/97.2, 97.5, 97.9, 97.7; 160/370.12, DIG. 3, 160/370.2, DIG. 31

See application file for complete search history.

(56) References Cited

U.S. PATENT DOCUMENTS

| 4,671,558 | A | * | 6/1987 | Cline ..................... 296/97.7 |
| 4,940,274 | A | * | 7/1990 | Ogren ..................... 296/97.7 |
| 4,944,548 | A | * | 7/1990 | Payne et al. ............. 296/97.8 |
| 5,004,285 | A | * | 4/1991 | Bennett ................. 160/370.23 |
| 5,016,937 | A | * | 5/1991 | White ...................... 296/97.7 |
| 5,064,239 | A | * | 11/1991 | Folcik ..................... 296/97.7 |
| 5,116,273 | A | | 5/1992 | Chan |
| 5,570,734 | A | * | 11/1996 | Wu ....................... 160/370.21 |
| 5,639,542 | A | * | 6/1997 | Howe et al. ............... 428/210 |

FOREIGN PATENT DOCUMENTS

| DE | 3718729 A1 | 12/1988 |
| DE | 43 38 523 A1 | 1/1995 |
| EP | 0193150 A2 | 9/1986 |
| EP | 0 945 292 A2 | 9/1999 |
| GB | 2 345 479 A | 7/2000 |

OTHER PUBLICATIONS

International Search Report Application No. PCT/GB2004/003205.
GB Search Report.

* cited by examiner

*Primary Examiner*—Lori L Lyjak
(74) *Attorney, Agent, or Firm*—Young Basile (57) ABSTRACT

A sunblind is disclosed for use with a window of a vehicle. The sunblind comprises a rigid frame has a closed-loop configuration and a panel of flexible material secured to the rigid frame. The panel has a desired degree of opacity to sunlight and extends over the interior of the rigid frame. The sunblind further has means for fixing the rigid frame to an interior surface of the vehicle such that the panel occludes at least part of the window to sunlight.

13 Claims, 5 Drawing Sheets

SUNBLIND

BACKGROUND OF THE INVENTION

This invention relates to sunblinds and in particular to sunblinds for absorbing or reflecting sunlight incident on the windows of a vehicle.

On a sunny day, the temperature inside a vehicle can rise to uncomfortable and even dangerous levels. Sunlight, which can be very intense during the summer months, passes through the windows of the vehicle and heats the air inside the vehicle until an equilibrium temperature is reached. The equilibrium temperature can be very high because the air inside a vehicle is predominantly trapped within the vehicle, and therefore heat transfer to the atmosphere surrounding the vehicle is low. Such a high temperature inside a vehicle can be highly uncomfortable for adults and potentially dangerous, or even deadly, for pets and small children.

One method of reducing the equilibrium temperature inside a vehicle on a sunny day is to use sunblinds to absorb or reflect sunlight incident on the windows of a vehicle. The less sunlight reaching the interior of the vehicle, the lower the equilibrium temperature will be inside the vehicle. Sunblinds are also used simply to shade the occupants of the vehicle, particularly young children, from direct sunlight.

Conventionally, a sunblind comprises a panel of completely opaque or semi-transparent fabric and means for fixing the fabric panel to an interior surface of the vehicle such that the fabric panel either partially or completely occludes the window to sunlight. A variety of different types of fixing means are used for conventional sunblinds. One such type of fixing means is the use of a suction pad at each corner of the fabric panel to fix the panel to the interior surface of a window. Another form of sunblind for vehicles includes a roller blind mechanism that is fixed to an upper edge of the window frame, for example.

However, conventional sunblinds for vehicles suffer from numerous problems. In particular, conventional sunblinds are often awkward and time consuming to position over a window, and then fix to an interior surface of the vehicle, so as to occlude at least part of the window to sunlight. In addition, many conventional sunblinds are only available in a limited number of different configurations, which each have a standard shape and standard dimensions, that are not suitable for use with certain windows in many makes and models of vehicles. Furthermore, where the sunblind does not occlude the whole of the window, it may be ineffective in shading the occupants of the vehicle from the sun. For instance, the sunblind may be positioned to provide effective shade prior to the start of a journey, but a change in direction of the vehicle will alter the angle of incidence of the sunlight. This may necessitate repeated adjustment of the position of the sunblind, which is clearly undesirable and inconvenient.

SUMMARY OF THE INVENTION

There has now been devised an improved sunblind, an improved method of manufacturing a sunblind, and an improved method of fixing a sunblind to a vehicle, which overcome or substantially mitigate the above-mentioned and/or other disadvantages associated with the prior art.

According to a first aspect of the invention, there is provided a sunblind for a window of a vehicle, the sunblind comprising a rigid frame having a closed-loop configuration, a panel of flexible material secured to the rigid frame, the panel having a desired degree of opacity to sunlight and extending over the interior of the rigid frame, and means for fixing the rigid frame to an interior surface of the vehicle such that the panel occludes at least part of the window to sunlight.

According to a further aspect of the invention, there is provided a method of manufacturing a sunblind for a window of a vehicle, the method comprising the following steps:

(a) forming a rigid frame having a closed-loop configuration;

(b) forming a panel of flexible material which has a desired degree of opacity to sunlight;

(c) securing the panel to the rigid frame such that the panel extends over the interior of the rigid frame; and (d) providing means for fixing the rigid frame to an interior surface of the vehicle such that the panel occludes at least part of the window to sunlight.

The sunblind according to the invention is advantageous principally because the rigid frame of the sunblind enables the sunblind to maintain its shape during use, thereby facilitating positioning the sunblind over the window, and fixing the sunblind to an interior surface of the vehicle, so as to occlude at least part of the window to sunlight. Furthermore, the feature of the sunblind that the rigid frame itself is fixed to the interior surface of the vehicle provides a more secure fixing arrangement than for conventional sunblinds where a flexible panel, rather than a rigid frame, is fixed to the interior surface of the vehicle. The sunblind may also be manufactured with a size and shape that correctly matches a particular window of a particular make and model of vehicle, thereby allowing the user to satisfactorily occlude irregularly-shaped windows to sunlight. Finally, improved fixing means, which require the sunblind to match the size and shape of the window, may be used with the sunblind according to the invention.

The configuration of the rigid frame, and therefore the sunblind itself, is preferably substantially planar in form. Most preferably, the sunblind is formed with a shape and dimensions that match those of a particular window in a particular make and model of vehicle. In this way, a user can purchase a sunblind that has been formed to match the particular window with which the user intends to use the sunblind. By "match" is meant that the shape and dimensions of the sunblind are selected by taking the shape and dimensions of the window with which the sunblind is intended for use into consideration. The actual shape and dimensions of the sunblind will also depend upon other factors, such as the type of fixing means used and the proportion of the window that the user wishes to occlude to sunlight. For instance, the sunblind may be formed with an identical shape and identical dimensions to those of the window so as to occlude the whole of the window to sunlight.

By "rigid" frame is meant that the frame is able to maintain its shape under the stresses and strains exerted on the frame by gravity and normal handling by the user. However, the rigid frame is preferably elastically deformable in response to deliberately increased pressure by the user.

The rigid frame is preferably a wire frame and is preferably formed from a length of wire with its ends butt-welded together so as to form a closed-loop configuration. The frame is preferably formed in a metal, such as mild steel. The metal wire of the frame preferably has a diameter in the range 2 mm to 6 mm, and most preferably in the range 3 mm to 5 mm, for example approximately 4 mm.

Preferably, the panel of flexible material is secured to the rigid frame in a tensioned state. The panel of flexible material is preferably secured to the rigid frame by a binding comprising a tape, preferably of a woven fabric, that extends around the edges of the rigid frame and is attached, most preferably by stitching, to a peripheral portion of the panel so as to form a tube that surrounds the frame and holds the panel in tension.

The desired degree of opacity of the panel of flexible material may be established by, for instance, an appropriate selection of the type and thickness of the flexible material, and/or inclusion of a number of apertures in the panel. For instance, the flexible material may be almost completely opaque to sunlight but the panel may include an array of apertures. Most preferably, the flexible material is a fabric.

The sunblind may incorporate a variety of means for fixing the rigid frame to an interior surface of the vehicle such that the panel occludes at least part of the window to sunlight. Preferably, however, the sunblind includes one or more fixing components that engage both an interior surface of the vehicle and the rigid frame of the sunblind so as to hold the sunblind in a fixed disposition relative to the window. Most preferably, the sunblind includes two fixing components disposed on opposing edges of the sunblind. The fixing components may be formed in metal or a plastics material. Where the fixing components are formed in metal, they are preferably coated in a plastics material for safety.

Most preferably, the sunblind includes at least two fixing components, which have the form of lugs, disposed on opposing edges of the rigid frame with each lug being adapted to engage a recess at the periphery of the window. The lugs are preferably planar in form and adapted to engage an appropriate part of the recess formed between a peripheral portion of the window and an adjacent surface of the window frame and any sealing material. Most preferably, the lugs extend outwardly from the rigid frame and are orientated in a plane parallel to that of the sunblind. Alternatively, the fixing components may comprise a plurality of clips mounted on the frame of the window which are adapted to engage with, and bind to, the rigid frame of the sunblind, preferably with a snap-fit.

The sunblind according to the invention is primarily intended for use whilst the vehicle is in use. For this reason, the sunblinds are primarily intended for use with the rear windows of a vehicle, which-normally include one or two pairs of rear side windows and a rear window. Since the sunblind is preferably formed with a shape and dimensions that match those of a particular window in a particular make and model of vehicle, the sunblind is preferably supplied as part of a set of sunblinds intended for use with all the rear windows of a particular make and model of vehicle. For convenience, a pair of sunblinds are preferably supplied to occlude the rear window, rather than a single sunblind of larger size.

Preferably, the rigid frame and/or the panel of flexible material are formed using machines operating under Computer-Numerical-Control (CNC), which is preferably achieved by means of a microprocessor. CNC allows the sunblind to be accurately manufactured with a shape and dimensions that match those of the window with which the sunblind is intended for use, as discussed above. Most preferably, the microprocessor is used to calculate the shape and dimensions of the rigid frame and/or the panel of flexible material for a sunblind intended for use with a window of particular shape and dimensions.

Preferably, once the rigid frame and panel of flexible material have been formed, the panel of flexible material is temporarily affixed to the rigid frame, whilst preferably in a tensioned state, before being more permanently secured to the rigid frame, as discussed above. The panel of flexible material is preferably temporarily affixed to the rigid frame using double-sided adhesive tape. -The adhesive tape is preferably applied first to the periphery of the rigid frame, and the panel is then positioned over the frame, its edges being engaged with the adhesive tape. Permanent fixing of the panel to the frame may then be achieved by the application of a tape binding surrounding the frame and stitched to the panel, as described above.

According to a further aspect of the invention, there is provided a method of fixing a sunblind to an interior surface of a vehicle so that the sunblind occludes at least part of a window to sunlight, the method comprising the following steps:

(a) providing a sunblind comprising a rigid frame having a closed-loop configuration, a panel of flexible material secured to the rigid frame, the panel having a desired degree of opacity to sunlight and extending over the interior of the frame, and first and second lugs disposed on opposing edges of the rigid frame, the first and second lugs being adapted to engage a first and second recess, respectively, at the periphery of the window;

(b) engaging the first lug with the first recess;

(c) deforming the rigid frame from a rest state into a deformed state so that the second lug is able to engage with the second recess;

(d) engaging the second lug with the second recess; and (e) reforming the rigid frame from the deformed state to the rest state so as to fix the sunblind to an interior surface of the vehicle.

The first and second lugs are preferably planar in form. In this case, the first and second recesses are preferably appropriate parts of the recess formed between a peripheral portion of the window and an adjacent surface of the window frame and any sealing material. Most preferably, the first and second lugs extend outwardly from the rigid frame and are orientated in a plane parallel to that of the sunblind.

The sunblind preferably includes a finger grip mounted on either the rigid frame-adjacent to the second lug, or the second lug itself, to facilitate deformation of the frame by the user. Where the finger grip is mounted on the rigid frame adjacent to the second lug, the finger grip is preferably a loop of fabric.

Finally, according to a further aspect of the invention, there is provided a vehicle fitted with a sunblind as described above.

BRIEF DESCRIPTION OF THE DRAWINGS

The invention will now be described in greater detail, by way of illustration only, with reference to the accompanying drawings, in which.

DETAILED DESCRIPTION OF THE PREFERRED EMBODIMENT

Figure 1:
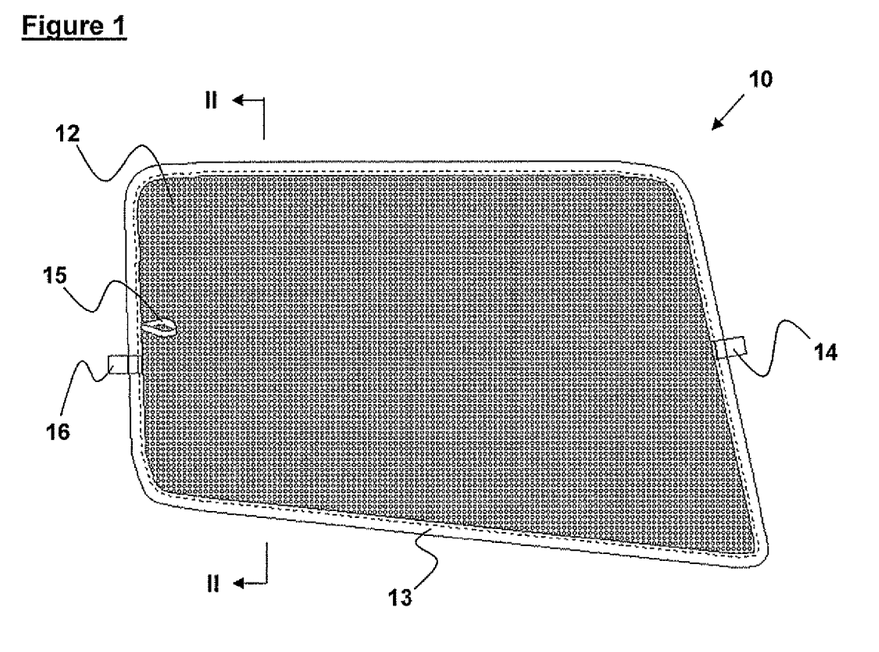
FIG. 1 is a front view of a sunblind according to the invention.
Figure 2:
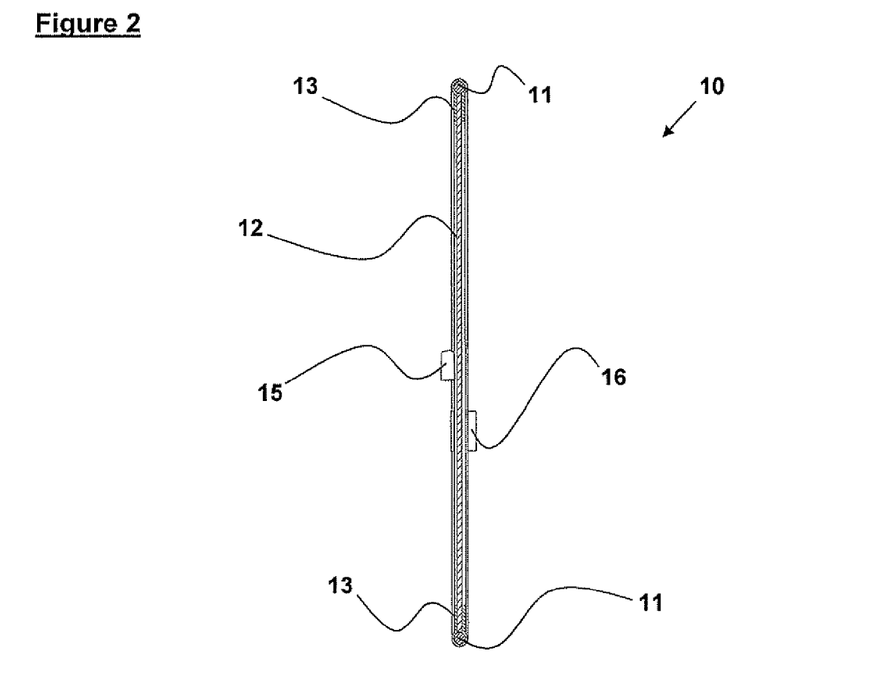
FIG. 2 is a cross-sectional view, along line II-II in FIG. 1, of the sunblind.

FIGS. 1 and 2 show a sunblind according to the invention which is generally designated 10. The sunblind 10 comprises a wire frame 11, a fabric panel 12 extending across the interior of the wire frame 11, and a fabric binding 13 securing the fabric panel 12 to the wire frame 11. The fabric panel 12 and the fabric binding 13 are each shown with an increased thickness in FIG. 2 for clarity.

The wire frame 11 is formed in a material that is sufficiently rigid for the wire frame 11 to maintain its shape under the stresses and strains exerted on the frame 11 by gravity and normal handling by the user. However, the wire frame 11 is preferably elastically deformable in response to deliberately increased pressure by the user during fixing of the wire frame 11 to the interior surface of the vehicle, as described below. In particular, the wire frame 11 is formed in a galvanised mild steel wire having a diameter of approximately 4 mm. During manufacture of the sunblind 10, the wire is formed by machinery operating under Computer-Numerical-Control (CNC) into a planar closed-loop configuration having a shape and dimensions that match those of a particular window of a particular make and model of vehicle, and the ends of the wire are butt-welded together to form the wire frame 11.

Figure 2A:
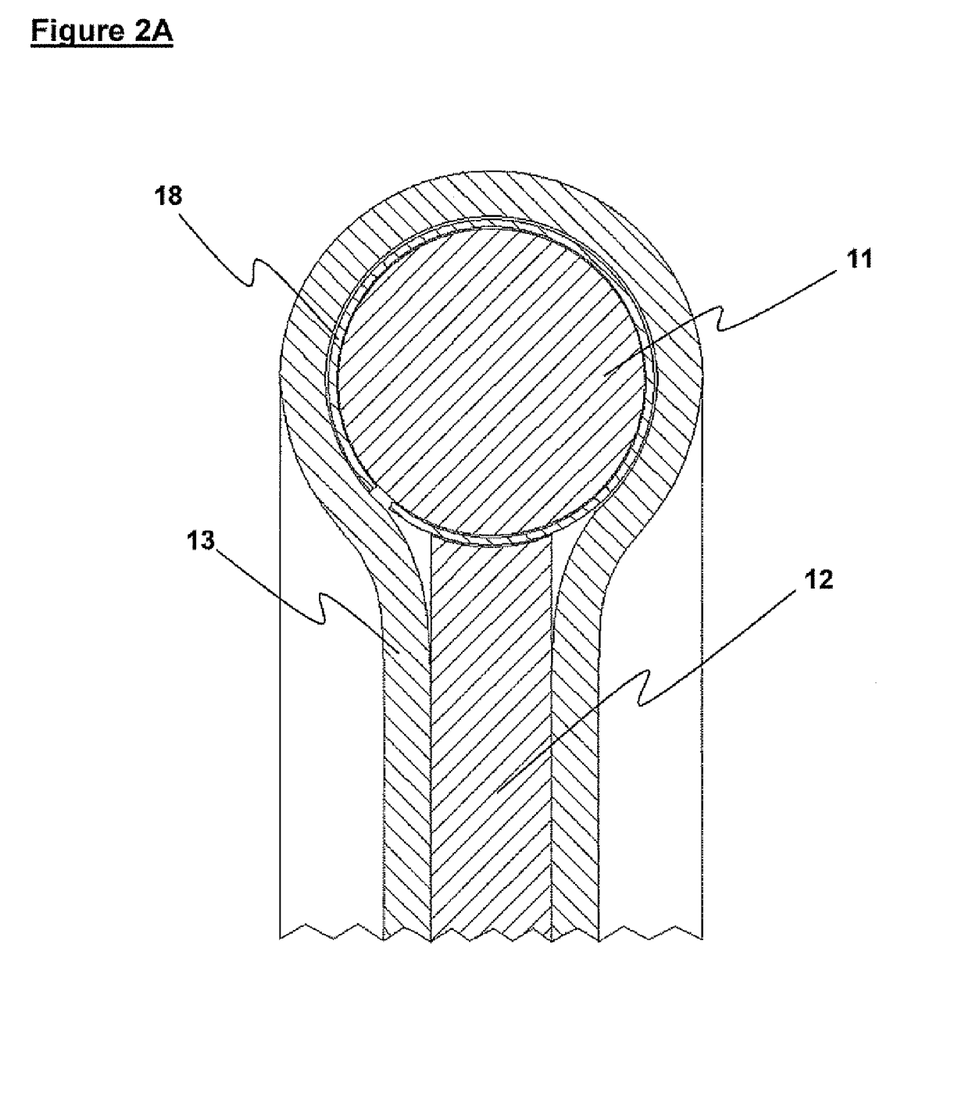
FIG. 2A is an enlarged view of a portion of the sunblind shown in FIG. 2 illustrating certain details.

The fabric panel 12 comprises a semi-transparent mesh of black polyester and has a fire retardant coating. The fabric panel 12 is formed with a shape and dimensions similar to those of the wire frame 11, by CNC-controlled cutting. During manufacture, once the wire frame 11 and fabric panel 12 have been formed, the peripheral edge of the fabric panel 12 is temporarily affixed to the wire frame 11 using double-sided adhesive tape 18 with the fabric panel 12 in a tensioned state. The adhesive tape 18 is applied first to the periphery of the wire frame 11, and the fabric panel 12 then positioned on the frame 11 so that its edges are held in place by the adhesive tape 18, as shown in FIG. 2A.

The fabric binding 13 comprises a rectangular strip of a woven material. Whilst the fabric panel 12 is temporarily affixed to the wire frame 11 by the adhesive tape, the fabric binding 13 is positioned lengthways alongside, and then wrapped around, the wire frame 11 so that the fabric binding 13 lies either side of a peripheral portion of the fabric panel 12. The fabric binding 13 is then stitched to the peripheral portion of the fabric panel 12 so that the fabric panel 12 is secured in a tensioned state by the fabric binding 13 to the wire frame 11. The fabric binding 13 should be sufficiently durable and strong to maintain the fabric panel 12 in a tensioned state throughout the lifetime of the sunblind 10.

Figure 6:
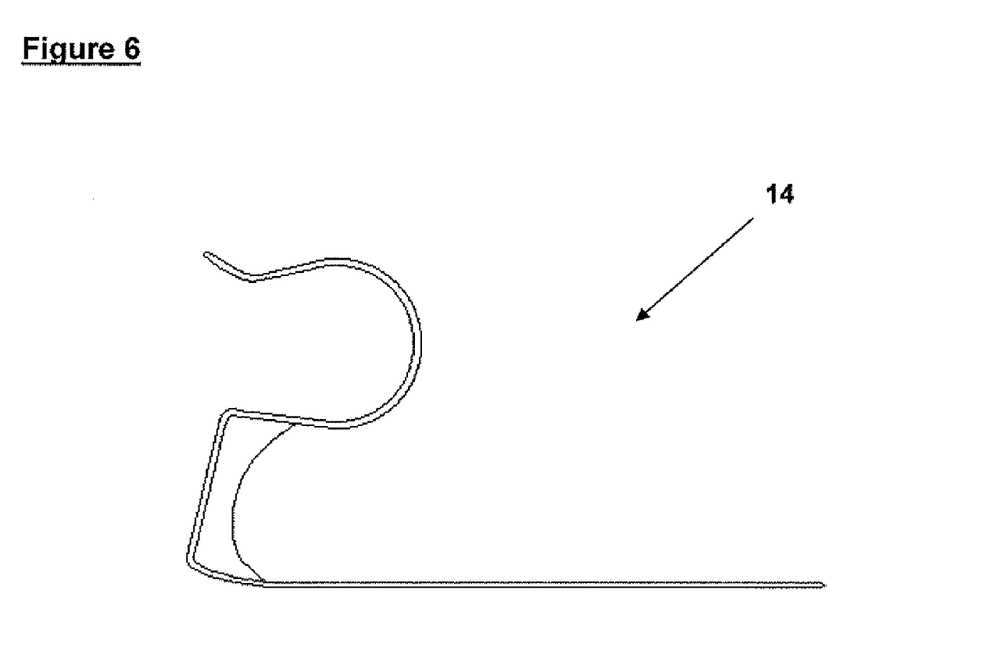
FIG. 6 is a side view of a fixing clip used with the sunblind of FIG. 1.

The sunblind 10 according to the invention further comprises means for fixing the wire frame 11 to an interior surface of a vehicle such that the fabric panel 12 occludes at least part of a window. The fixing means of the sunblind 10 shown in FIGS. 1 and 2 comprises a first fixing clip 14, a finger grip 15 and a second fixing clip 16. The first and second clips 14,16 are disposed on opposing edges of the wire frame 11. Where the wire frame 11 is generally oblong in shape, as for the sunblind 10 of FIGS. 1 and 2, the clips 14,16 are preferably disposed on the minor edges at either end of the wire frame 11. The clips 14,16 are formed in spring steel with a plastic coating. As can be seen from FIG. 6, each clip 14,16 comprises a clip portion that engages the wire frame 11 and the surrounding fabric binding 13 with a snap-fit, and a planar extension that projects outwardly from the wire frame 11 and is orientated in a plane substantially parallel to that of the sunblind 10. The finger grip 15 is a loop of material that is stitched to the fabric binding 13 adjacent to the second clip 16.

Figure 3:
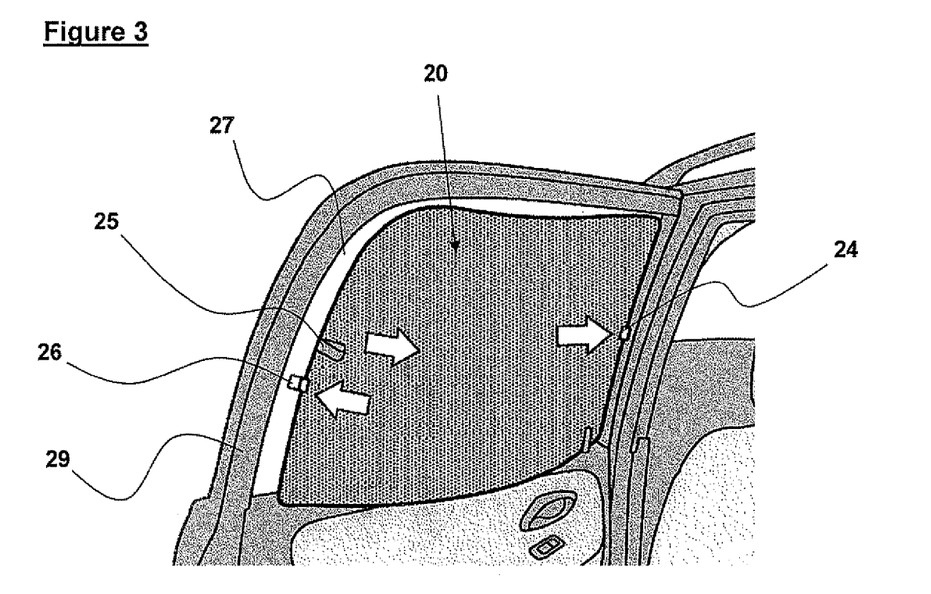
FIG. 3 is a schematic diagram illustrating a method of fixing a sunblind to an interior surface of a vehicle so as to occlude at least part of a side window to sunlight.
Figure 4:
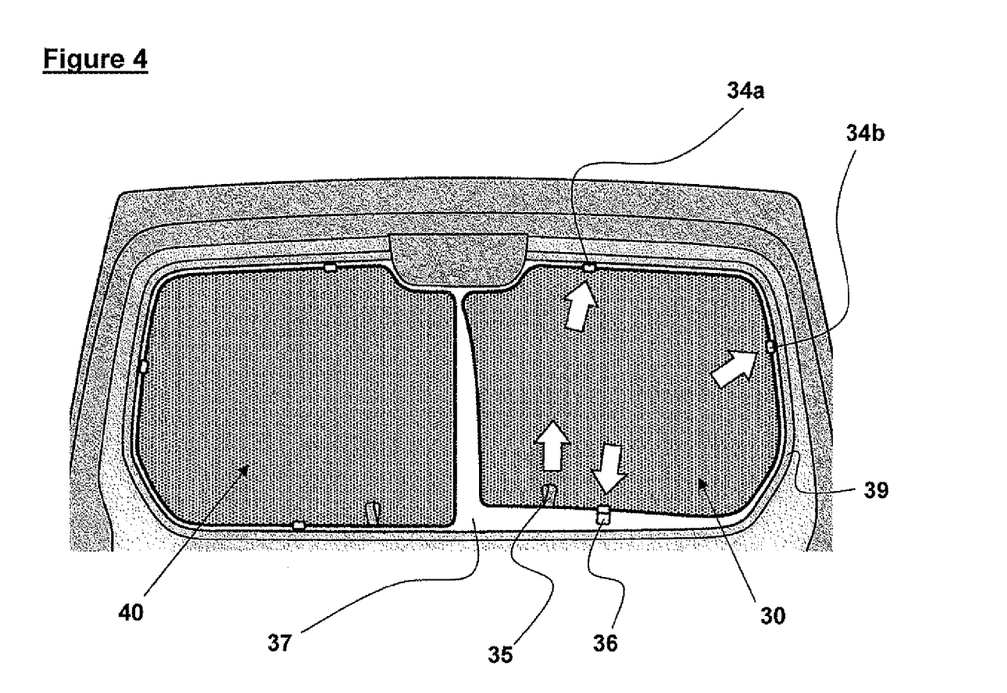
FIG. 4 is a schematic diagram illustrating a method of fixing a sunblind to an interior surface of a vehicle so as to occlude at least part of a rear window to sunlight.

FIGS. 3 and 4 each illustrate a method of fixing a sunblind to an interior surface of a vehicle so as to occlude at least part of a window. FIG. 3 illustrates such a method using a sunblind 20, which is similar to the sunblind 10 shown in FIGS. 1 and 2, to occlude a side window 27 of a vehicle. The sunblind 20 of FIG. 3 has been manufactured with a shape and dimensions that are identical to those of the side window 27 shown in FIG. 3, thereby enabling the sunblind 20 to occlude the whole of the side window 27.

Figure 5:
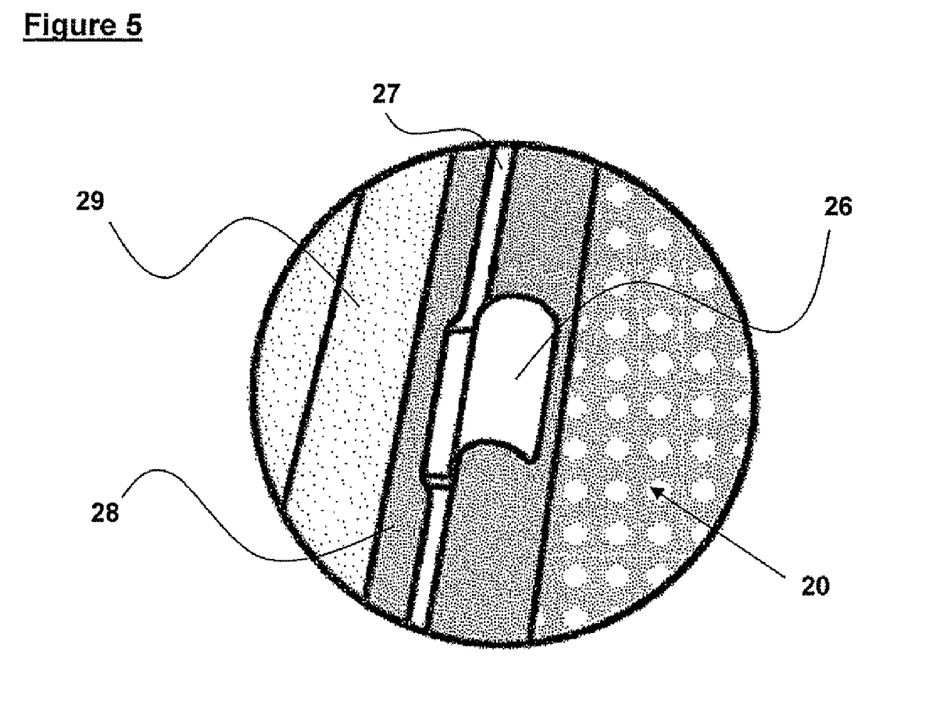
FIG. 5 is a close-up perspective view of part of a sunblind according to the invention that is fixed to an interior surface of a vehicle so as to occlude at least part of a window to sunlight.

The sunblind 20 is offered up to the side window 27 in a correct orientation to occlude the whole of that window 27 to sunlight. In this case, the sunblind 20 is orientated horizontally with the first and second clips 24,26 each being adjacent to an upright edge of the window frame 29. The extension of the first clip 24 is then inserted into, and fully engaged with, an appropriate part of the peripheral recess that is formed between the internal surface of the window 27 and the rubber seal 28 (shown in FIG. 5) formed on an internal surface of the window frame 29. The user then deforms the sunblind 20, by pulling the finger grip 25 away from the adjacent upright edge of the window frame 29 and towards the first clip 24, until the sunblind 20 has been deformed sufficiently for the second clip 26 to be inserted into an appropriate part of the peripheral recess. The second clip 26 is then inserted into the appropriate part of the peripheral recess, and the finger grip 25 is slowly released until the second clip 26 is fully engaged with the peripheral recess. The rigidity of the wire frame of the sunblind 20 maintains the extensions of the first and second clips 24,26 within the peripheral recess, thereby fixing the sunblind 20 to the interior surface of the vehicle so as to occlude the whole of the side window 27 to sunlight. FIG. 5 shows a close-up view of the second clip 26 engaged with the peripheral recess.

In order to remove the sunblind 20 from the side window 27, the user pulls the finger grip 25 away from the adjacent part of the peripheral recess, and towards the first clip 24, until the sunblind 20 has been deformed sufficiently for the second clip 26 to be removed from the peripheral recess. The second clip 26 is then moved away from the window 27 and the peripheral recess, and the finger grip 25 is slowly released with the second clip 26 disengaged from the peripheral recess. Finally, the first clip 24 is also removed from the peripheral recess.

FIG. 4 illustrates a method of fixing a pair of sunblinds, generally designated 30 and 40, to an interior surface of a vehicle so as to occlude a rear window 37 to sunlight. The sunblinds 30,40 of FIG. 4 are similar to the sunblinds 10,20 of FIGS. 1, 2 and 3 save for each sunblind 30,40 having a first clip 34a, a second clip 34b and a third clip 36 disposed, on adjacent edges of the sunblind 30,40, and the sunblinds 30,40 being adapted to occlude opposing halves of the rear window 37 to sunlight.

Each sunblind 30,40 shown in FIG. 4 is fixed to the interior surface of the vehicle in a similar manner to the sunblind 20 of FIG. 3. However, when the sunblind 30 is offered up to the rear window 37, the first clip 34a is adjacent to an upper edge of the window frame 39, the second clip 34b is adjacent to an upright edge of the window frame 39, and the third clip 36 is adjacent to a lower edge of the window frame 39. The extensions of the first and second clips 34a,34b are then inserted into appropriate parts of the peripheral recess that is formed between an internal surface of the window 37 and the rubber seal formed on an internal surface of the window frame 39. The user then deforms the sunblind 30, by pulling the finger grip 35 upwards and away from the adjacent lower edge of the window frame 39, until the sunblind 30 has been deformed sufficiently for the third clip 36 to be inserted into an appropriate part of the peripheral recess. The third clip 36 is then inserted into the appropriate part of the peripheral recess and the finger grip 35 is slowly released until the third clip 36 is fully engaged with the peripheral recess. The rigidity of the wire frame of the sunblind 30 maintains the extensions of the first, second and third clips 34a,34b,36 within the peripheral recess, thereby fixing the sunblind 30 to the interior surface of the vehicle so as to occlude one half of the rear window 37. This method is then repeated for the other sunblind 40 so as to occlude the other half of the rear window 37.

Figure 7:
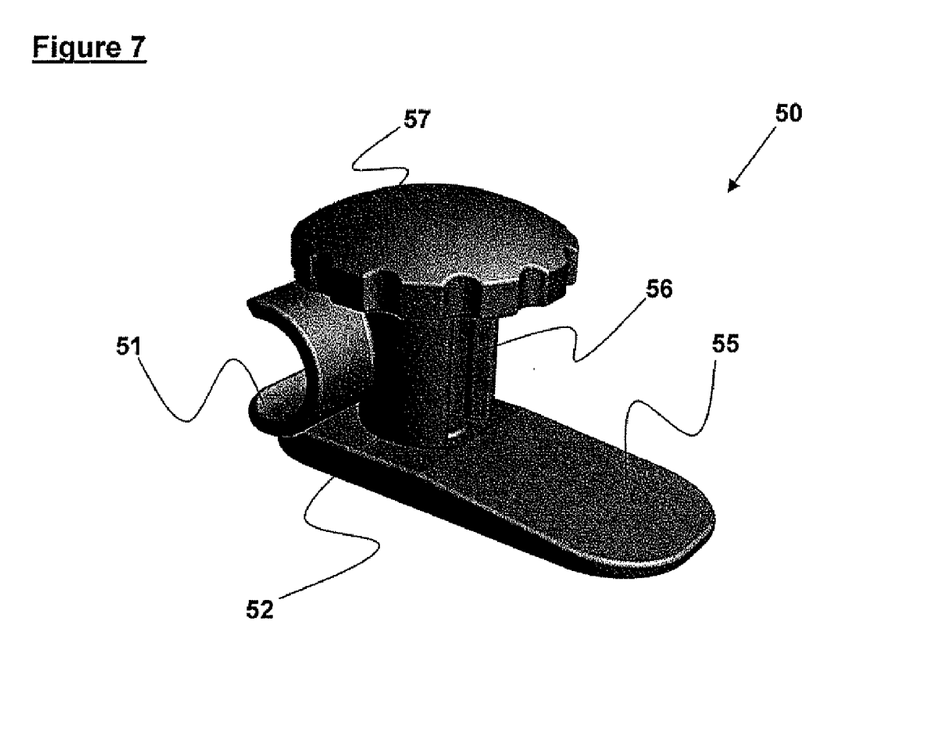
FIG. 7 is a perspective view of an alternative form of fixing clip for use with a sunblind according to the invention.
Figure 8:
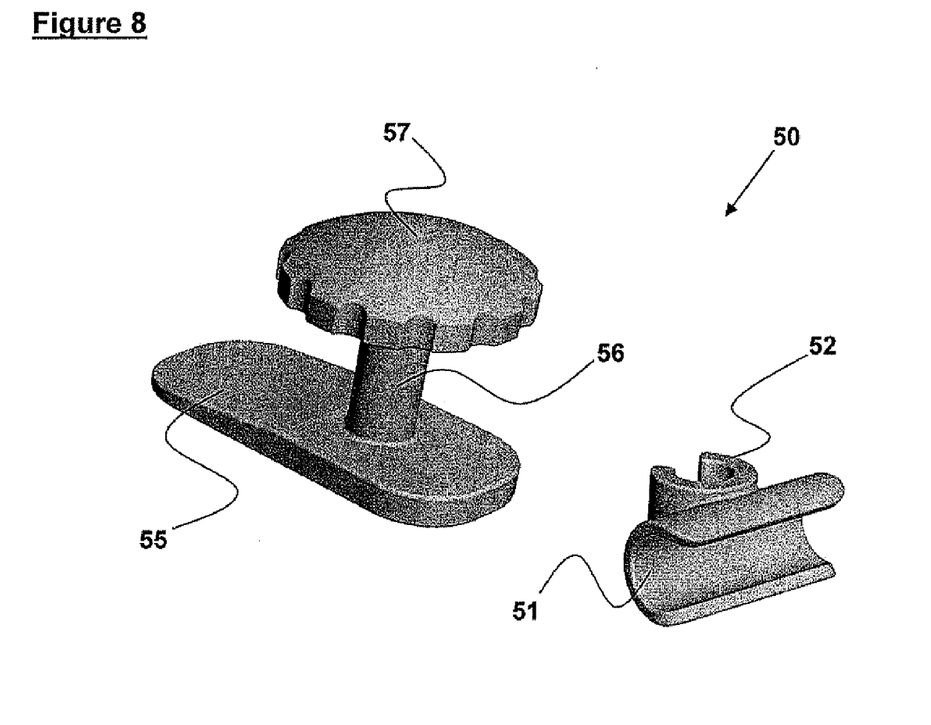
FIG. 8 is an exploded perspective view of the fixing clip of FIG. 7.

Turning finally to FIGS. 7 and 8, an alternative form of fixing clip 50 is shown for use with a sunblind according to the present invention, such as those sunblinds 10,20,30 described above. The alternative fixing clip 50 comprises first and second cooperating components that are formed separately from plastics material before being engaged with one another to form the fixing clip 50.

The first component of the alternative fixing clip 50 comprises a clip member 51 for engagement with the sunblind, and a mount 52 for engagement with the second component of the fixing clip 50. The clip member 51 has a constant C-shaped cross-section which defines an opening and a channel within which the clip member 51 receives, with a snap fit, the wire frame and the surrounding fabric binding of the sunblind. The mount 52 is similar in form to the clip 51 in that it comprises a member of C-shaped cross-section which defines an opening and a channel. The clip member 51 and the mount 52 are disposed in a back-to-back relationship and are orientated perpendicularly relative to each other, as shown most clearly in FIG. 8.

The second component of the alternative fixing clip 50 comprises a generally rectangular and planar base 55 having a support portion and an extension portion, a cylindrical support pillar 56 extending perpendicularly upwards (as shown in FIGS. 7 and 8) from the upper surface of the support portion of the base 55, and a generally circular handle 57 disposed at the top of the support pillar 56.

The extension portion of the base 55 extends away from the support portion and the support pillar 56, and has an inclined upper surface such that the extension portion of the base 55 is tapered in form. This extension portion is adapted to engage, in use, an appropriate part of the peripheral recess that is formed between the internal surface of the window and the rubber seal formed on an internal surface of the window frame.

The mount 52 of the second component engages, with a snap fit, the support pillar 56 of the first component so as to form the alternative fixing clip 50.

The alternative fixing clips 50 are used in a similar manner to the fixing clips 14,16,24,26,34a,34b,36 of the sunblinds 10,20,30 described above. However, the handles of the alternative fixing clips 50 may be grasped by a user to facilitate deformation of the wire frame and/or location of the extension portions within the peripheral recess, during use.

The invention claimed is:

1. A sunblind for a window of a vehicle, the sunblind comprising a rigid frame having a closed-loop configuration, a panel of flexible material secured to the rigid frame, the panel having a desired degree of opacity to sunlight and extending over the interior of the rigid frame, and at least one fixing component for fixing the rigid frame to an interior surface of the vehicle such that the panel occludes at least part of the window to sunlight the at least one fixing component comprising a clip portion that engages the rigid frame with a snap-fit and a planar extension adapted to engage an appropriate portion of a recess formed between a peripheral portion of the window and an adjacent surface of a frame of the window with any sealing material.

2. A sunblind as claimed in claim 1, wherein the sunblind is formed with a shape and dimensions that match those of a particular window in a particular make and model of vehicle.

3. A sunblind as claimed in claim 2, wherein the sunblind is formed with an identical shape and identical dimensions to those of the window so as to occlude the whole of the window to sunlight.

4. A sunblind as claimed in claim 1, wherein the rigid frame is elastically deformable in response to deliberately increased pressure by a user.

5. A sunblind as claimed in claim 1, wherein the rigid frame is formed from a length of wire.

6. A sunblind as claimed in claim 1, wherein the panel of flexible material is secured to the rigid frame in a tensioned state.

7. A sunblind as claimed in claim 6, wherein the panel of flexible material is secured to the rigid frame by a binding comprising a tape that extends around the edges of the rigid frame and is attached to a peripheral portion of the panel so as to form a tube that surrounds the frame and holds the panel in tension.

8. A sunblind as claimed in claim 1, wherein the flexible material is a fabric.

9. A sunblind as claimed in claim 1, wherein the sunblind includes two fixing components disposed on opposing edges of the sunblind.

10. A method of manufacturing a sunblind for a window of a vehicle, the method comprising the following steps:
 (a) forming a rigid frame having a closed-loop configuration;
 (b) forming a panel of flexible material which has a desired degree of opacity to sunlight;
 (c) temporarily affixing the panel of flexible material, while in a tensioned state, to the rigid frame;
 (d) securing the panel to the rigid frame such that the panel extends over the interior of the rigid frame; and
 (e) providing means at least one fixing component for fixing the rigid frame to an interior surface of the vehicle such that the panel occludes at least part of the window to sunlight, wherein the panel of flexible material is temporarily affixed to the rigid frame using double-sided adhesive tape.

11. A method of fixing a sunblind to an interior surface of a vehicle so that the sunblind occludes at least part of a window to sunlight, the method comprising the following steps:
 (a) providing a sunblind comprising a rigid frame having a closed-loop configuration, a panel of flexible material secured to the rigid frame, the panel having a desired degree of opacity to sunlight and extending over the interior of the frame, and first and second fixing components disposed on opposing edges of the rigid frame, the first and second fixing components, each component comprising a clip portion that engages the rigid frame with a snap-fit and a planar extension, the planar extensions of the first and second fixing components being adapted to engage first and second recesses formed between a peripheral portion of the window and an adjacent surface of a frame of the window and any sealing material;
 (b) engaging the planar extension of the first fixing component with the first recess;

(c) deforming the rigid frame from a rest state into a deformed state so that the planar extension of the second fixing component is able to engage with the second recess;

(d) engaging the planar extension of the second fixing component with the second recess; and (e) reforming the rigid frame from the deformed state to the rest state so as to fix the sunblind to an interior surface of the vehicle.

12. A method as claimed in claim 11, wherein the sunblind includes a finger grip mounted on either the rigid frame adjacent to the second fixing component, or the second fixing component itself, to facilitate deformation of the frame.

13. A vehicle fitted with a sunblind, the sunblind comprising a rigid frame having a closed-loop configuration, a panel of flexible material secured to the rigid frame, the panel having a desired degree of opacity to sunlight and extending over the interior of the rigid frame, and at least one fixing component for fixing the rigid frame to an interior surface of the vehicle such that the panel occludes at least part of the window to sunlight the at least one fixing component comprising a clip portion that engages the rigid frame with a snap-fit and a planar extension adapted to engage an appropriate portion of a recess formed between a peripheral portion of the window and an adjacent surface of a frame of the window with any sealing material.

* * * * *